March 24, 1970  H. J. PLUMMER  3,502,758
PRODUCTION OF BLOW MOULDED ARTICLES
Filed Nov. 1, 1966  6 Sheets-Sheet 3

INVENTOR:
HENRY JAMES PLUMMER
BY Kurt Kelman
AGENT

March 24, 1970     H. J. PLUMMER     3,502,758
PRODUCTION OF BLOW MOULDED ARTICLES Filed Nov. 1, 1966     6 Sheets-Sheet 4

INVENTOR:
HENRY JAMES PLUMMER
BY Kurt Kelman
AGENT

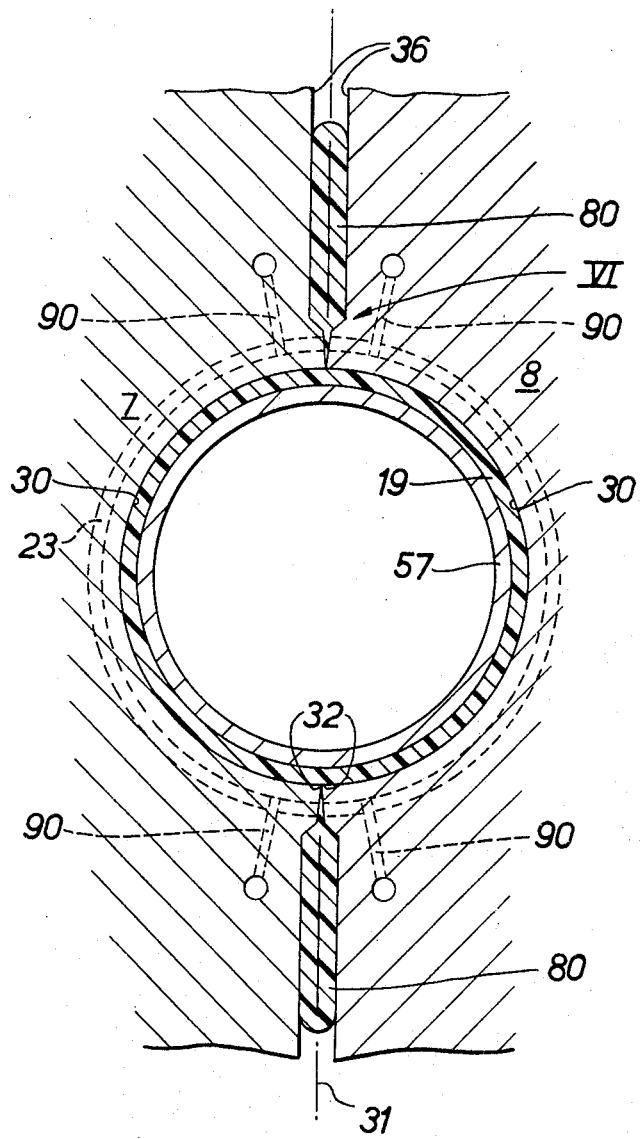

March 24, 1970         H. J. PLUMMER                3,502,758
              PRODUCTION OF BLOW MOULDED ARTICLES
Filed Nov. 1, 1966                              6 Sheets-Sheet 6
FIG. 7.
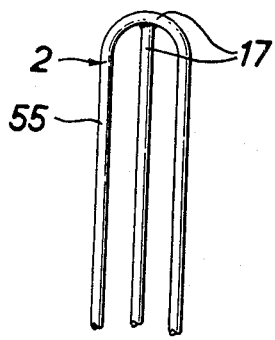
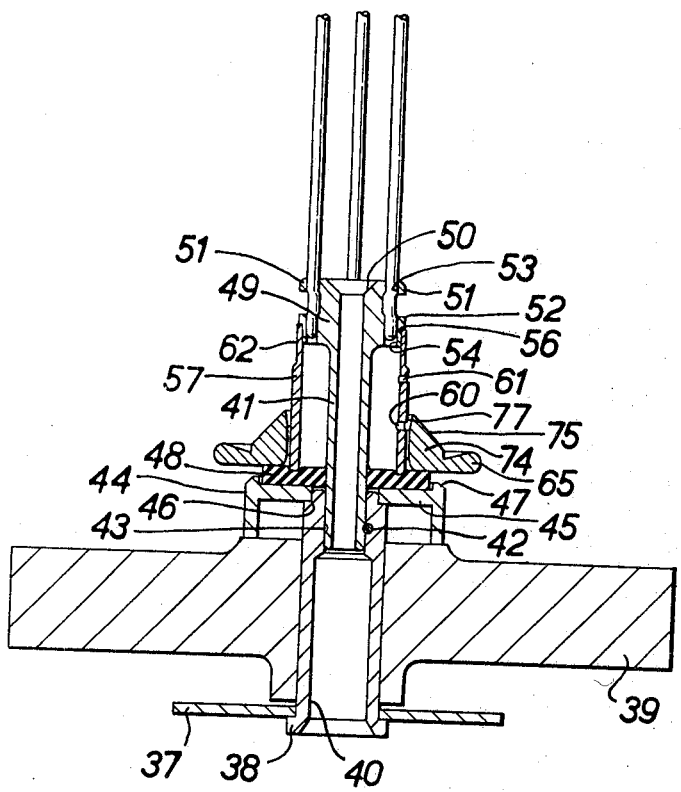
INVENTOR:
HENRY JAMES PLUMMER
BY Kurt Kelman
    AGENT United States Patent Office 3,502,758
Patented Mar. 24, 1970

3,502,758
PRODUCTION OF BLOW MOULDED ARTICLES
Henry James Plummer, Woodley, England, assignor, by mesne assignments, to Tenneco Chemicals, Inc., a corporation of Delaware
Filed Nov. 1, 1966, Ser. No. 591,269
Claims priority, application Great Britain, Nov. 9, 1965, 47,525/65
Int. Cl. B29d 23/03; B29h 1/02
U.S. Cl. 264—98
3 Claims

ABSTRACT OF THE DISCLOSURE

The present invention relates to the manufacturing of blow-moulded plastic articles having a body portion and a neck portion at one end of the body portion. A pressure deformable tube is positioned in an open, split mould with a neck insert in the lower end of the tube. The split mould is adapted, when closed, to close the upper end portion of the tube, define a cavity the shape of the body portion and press the tube against the insert which is provided with a body blowing orifice through which fluid under pressure can be blown to form the body portion. The split mould may include hollow, bead-forming cavities arranged so that upon closure of the mould a hollow cavity encircles the neck portion between portions pressed against the insert. Fluid under pressure may be blown through a bead-blowing port in the insert to expand the tube outwardly in the bead cavity and form the hollow bead around the neck. Preferably the mould is provided with breather passages extending from the bead cavity so that air bleeds from the cavity when the bead is blown. In addition the tube may be larger in diameter than the insert and may be supported on a ring having a frustoconical surface portion extending upwardly and inwardly inside the bottom end portion of the tube below the mould so that when the mould is closed, a lower portion of the tube is drawn inwardly against the frusto-conical portion to form an outwardly flared scrap portion below the mould. Cooling fluid is blown against the scrap portion so that the scrap portion can be readily broken away from the neck portion.

This invention relates to the production of blow-moulded articles and, more specifically, is concerned with the production of articles, such as bottles, formed by blow-moulding a cylindrical tube section in a mould cavity which is shaped to form a neck at one end of the article.

In our British Patent No. 987,883 we have described a method of mass producing, by a blow-moulding technique, hollow articles, such as bottles, made of thermoplastics material. The thermoplastics material is first extruded in the form of a thin-walled cylindrical tube which is cut into sections. The sections may be stored or used immediately. The moulding apparatus is provided with a conveyor carrying upright mandrels which pass, in turn, a loading station where the cylindrical tube sections are loaded individually onto the mandrels, an oven where the loaded tube sections have their temperatures raised gradually to a predetermined temperature at which the hot tube sections, or parisons are sufficiently rigid to support their own weight yet are soft enough to be blow-moulded, a moulding station where the parisons are centred in moulds and blow-moulded so that their outside surfaces are expanded into conformity with the interior contour of the mould, and a stripping station where the blow-moulded articles produced in the moulds are moved from their mandrels and surplus plastic material adhering to them is stripped off.

The use of cylindrical tube sections is particularly convenient for blow-moulding as they can be quickly and cheaply produced by extrusion. However, there is a limit to the extent to which a cylindrical tube section can be expanded by blow-moulding and this imposes a limit on the shape of articles produced. In the case of polyvinyl chloride (PVC) we have found out that, in practice, the permissible blow-up ratios lie between 2.6:1 and 3.2:1 at temperatures between 150° C. and the maximum of 190° C. at which degradation of PVC occurs. In the process described in our Patent No. 987,883 the parisons which enter the mould must be sufficiently strong to be self-supporting and this imposes a practical maximum temperature on the parisons leaving the oven of 165° C. At this temperature the permissible blow-up ratio is only 2.8:1. The minimum diameter of a bottle produced by blow-moulding is normally its neck and this normally corresponds closely to the diameter of the parison before blow-moulding.

If it was desired, when using the blow-moulding process specifically described in our Patent No. 987,883, to produce bottles having a different sized neck it was necessary to provide tube sections of a diameter corresponding approximately to each neck size. This meant that extrusion heads of different sizes had to be available and the process did not lend itself economically to producing limited numbers of bottles as the replacement of the extrusion head interrupted the economic production of extruded tubing. Also, difficulties were experienced in setting up the extrusion head to provide tubing of the desired dimensions although such difficulties can now be largely overcome by using an extrusion head as described in our co-pending British application No. 39,849/65. Even allowing for the need to provide tubing of a different diameter for each neck size of the bottle to be produced, the process still has the disadvantage that it is not possible to use it for producing bottles having a maximum body diameter to neck diameter in excess of 2.8:1. A relatively large market of cosmetic and other bottles are so dimensioned, and thus the manufacture of these bottles have hitherto been denied to the process.

An object of this invention is the provision of a blow-moulding process usable to produce hollow moulded articles having a blow-up ratio greater than 2.8:1.

In accordance with the present invention an article having a neck at one end is manufactured by stationing a pressure-deformable tube section having a neck insert spaced inside one end portion in an open mould which is split lengthwise of the tube section into mould parts having neck-forming surfaces disposed around said one end-portion and which come together to define an external neck surface of smaller peripheral length than the periphery of the tube section, closing the split mould so that the end-portion of the tube section is compressed into intimate contact with the neck insert by the closing neck-forming surfaces and surplus material is bulged out between said mould parts as they close, squeezing the bulged-out portions of surplus material into flattened folds between opposed lands formed on the closing parts of the mould, and pinching the roots of the folds where they join the neck of the article between cutting edges formed on the mould parts.

The advantage of the invention is that it enables blow-moulded articles to be produced in which the diameter of the neck may be considerably less than the diameter of the tube section, as it is formed by compressing the tube section about the neck insert and allowing material which is surplus as a result of the reduction in cross-section of the tube section to be squeezed out into the flattened folds. The maximum diameter of the articles so produced is still determined by the blow-up ratio of 2.8 times the diameter of the original tube section but the neck diameter is now independent of the diameter of the tube section and can be made very much less so that the ratio of the body diameter of the blow-moulded article to the neck diameter can exceed 2.8 to 1. This has hitherto not been thought possible as the art has always taught that the neck of the finished article should correspond in diameter approximately to the diameter of the parison to be blow moulded. It will therefore be appreciated that by using the process of the present invention in the method described in Patent No. 987,883 a greater versatility of apparatus is obtained as the aforesaid large cosmetic market previously closed to the process is now open. Also, it is no longer necessary to produce a different diameter of tubing for each neck size of article as the neck diameter is determined by the mould and neck insert, and not by the parison diameter before moulding.

We have found that unless the bulged-out folds or tucks produced around the neck during closing of the mould parts are flattened between opposed lands, a notch is formed on the inside wall of the neck immediately opposite the parting line of the mould and serves as a leakage point when a plug is inserted in the neck of the article. It is believed that the flattening of the bulging folds provides a degree of back pressure which prevents the inside wall of the neck developing the notch during its formation so that there is no danger of leakage through the notch when the article is filled with liquid and stoppered.

The invention also provides blow-moulding apparatus having a moulding station provided with a split mould formed by mould parts movable towards and away from one another to close and open the mould, a conveyor for carrying into the open mould a mandrel bearing a tube section to be blow-moulded, a nozzle ferrule disposed at one end of the mandrel for injecting pressure fluid into the tube section when trapped in the closed mould, a neck insert surrounding the nozzle ferrule and for forming the desired interior neck surface of the article to be produced, compression surfaces formed on the mould parts where they come together around the neck insert, each compression surface including a sharp edge lying in the surface of the mould cavity and extending along the split line between the mould parts when closed, a relatively short ramp surface extending away from the mould cavity from the sharp edge and inclined at substantially five degrees to the radial line of the split, and a flat land extending substantially parallel to the said radial line and joined by a step to the ramp surface.

When the apparatus of the invention is in use the bulged-out folds of surplus material from the neck region of the article are conmpressed into flattened folds by the flat parallel lands as they come together, and the roots of the flattened folds are nipped between the sharp edges so that the surplus material of the article around the neck may be easily stripped away at the stripping station after the mould has opened.

Where the neck of the article is deformed into a circular cross-section it can happen that a crescent-shaped pocket of air is trapped between the neck surfaces of the mould and the outside of the neck. These pockets of air cause small indentations to occur in the outside wall of the neck which are not desirable. These pockets of air, may, however, be removed by providing the mould parts with small radial breather holes through which the air pockets exhaust during closure of the mould. We have found that in practice the breather holes should be provided at approximately 5 degrees from the radial spilt lines of the mould.

The invention will now be described in more detail, by way of example, with reference to the diagrammatic accompanying drawings, in which:

FIGURE 5 is a cross section through FIGURE 2 taken on the line indicated by the arrows V—V in that figure;

FIGURE 7 is an axial section through a mandrel and support unit, partly broken away.

Figure 1:
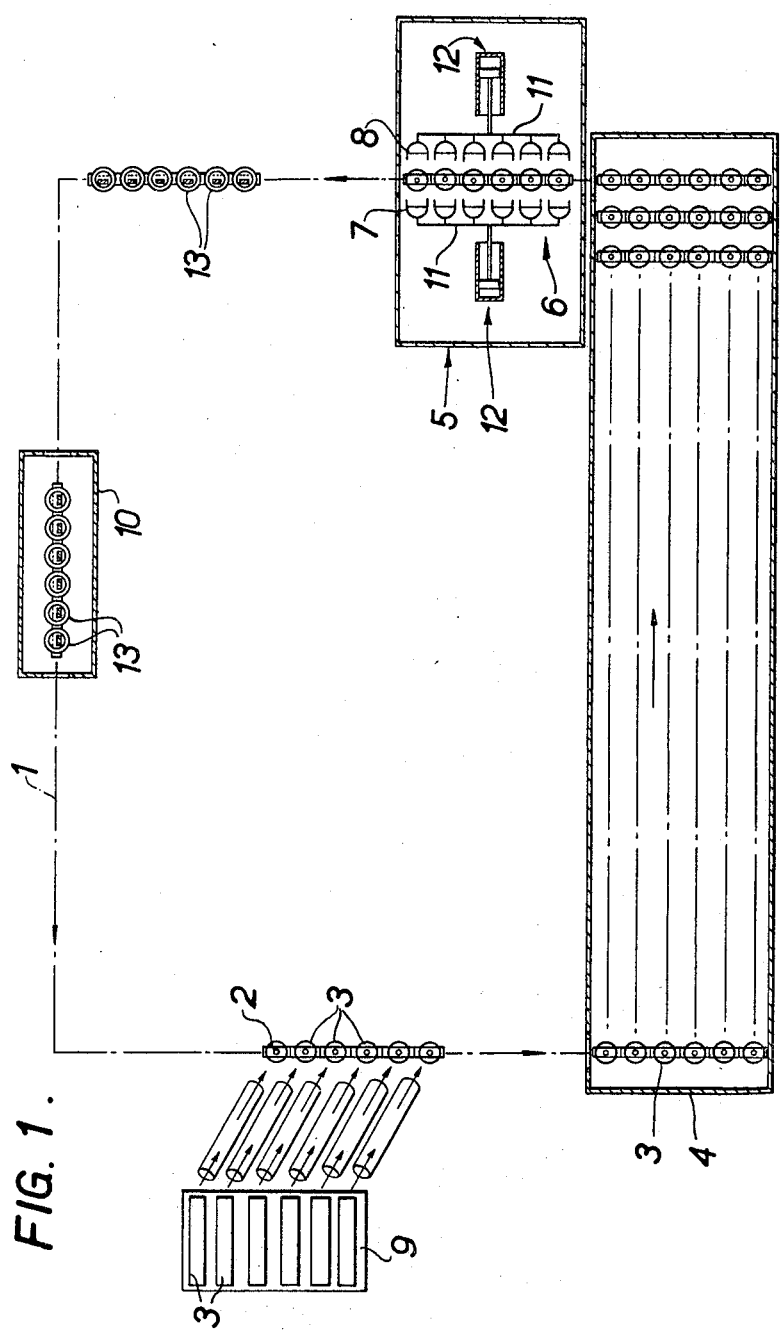
FIGURE 1 represents schematically apparatus for blow moulding parisons to form inverted bottle-shaped articles.

The apparatus is arranged to blow-mould hot cylindrical tube sections or parisons made from polyvinyl chloride which is extruded by means of an extrusion diehead not shown but described in our aforementioned copending application. The apparatus is of the form described in our aforementioned patent and is shown diagrammatically in FIGURE 1 from which it will be seen to comprise a horizontally moving conveyor 1 provided with spaced upright mandrels 2 on which tube sections 3 are individually loaded from a tube store 9. The mandrels 2 are loaded in sets of six and each batch of six tube sections 3 is conveyed by the six mandrels 2 of the set into an oven 4. The tube sections 3 travel slowly through the oven which is temperature controlled and their temperatures are gradually raised to a moulding temperature of 165° C. The hot tube sections, or parisons, are conveyed from the oven in batches of six to a moulding station 5 where six split moulds 6 are provided to mould the parisons into articles 13. The moulded articles 13 are then carried by the conveyor 1 from the moulding station 5 to a stripping station 10 where they are lifted from the mandrels 2 which are then transported once again past the tube store 9 for reloading with tube sections.

The six moulds 6 are spaced lengthwise of the path of movement of the conveyor 1 and each is in two parts 7, 8 disposed on opposite sides of the conveyor 1 respectively. The six mould parts at each side of the conveyor are connected to a horizontal beam 11 which is reciprocatable towards and away from the conveyor 1 by a hydraulically operated piston ram 12 to close and open the moulds together.

Figure 2:
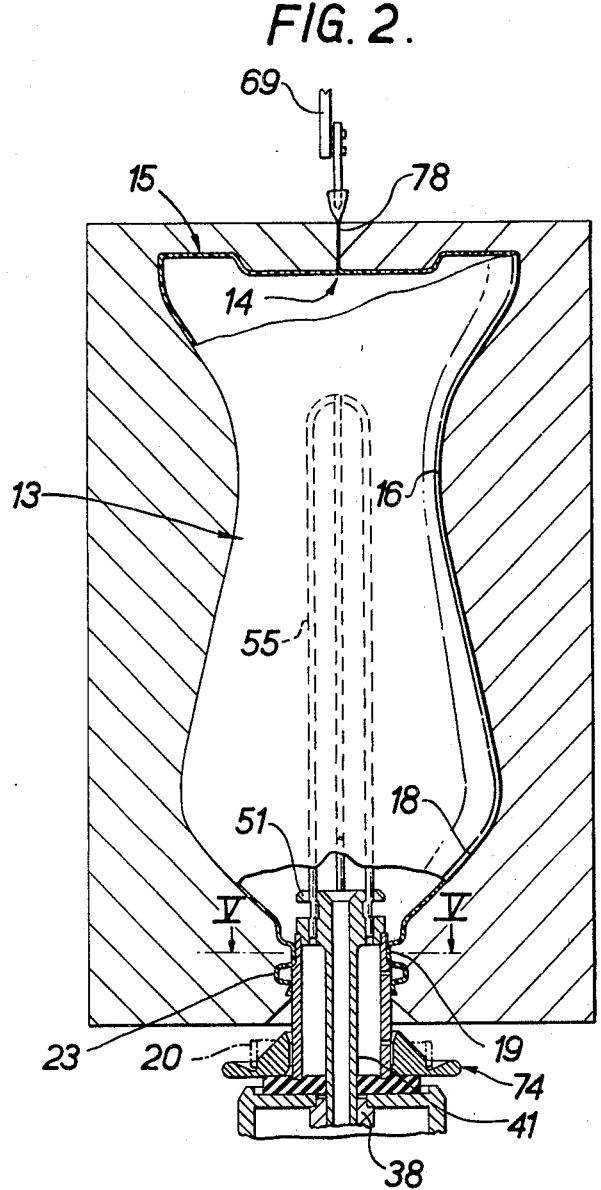
FIGURE 2 is a diagrammatic section through a closed mould and a contained bottle partly broken away.

Each mould 6 is split diametrically and when closed the contour of its cavity defines the outside wall of an inverted bottle 13 as shown in FIGURE 2. The base 14 of the bottle is formed in the top of the mould cavity and an annular projecting mound 15 is formed on the base surface on which the bottle stands when in use. The body 16 of the bottle is a waisted cylinder, and it may be provided with peripheral grooves to give it added strength.

Figure 3:
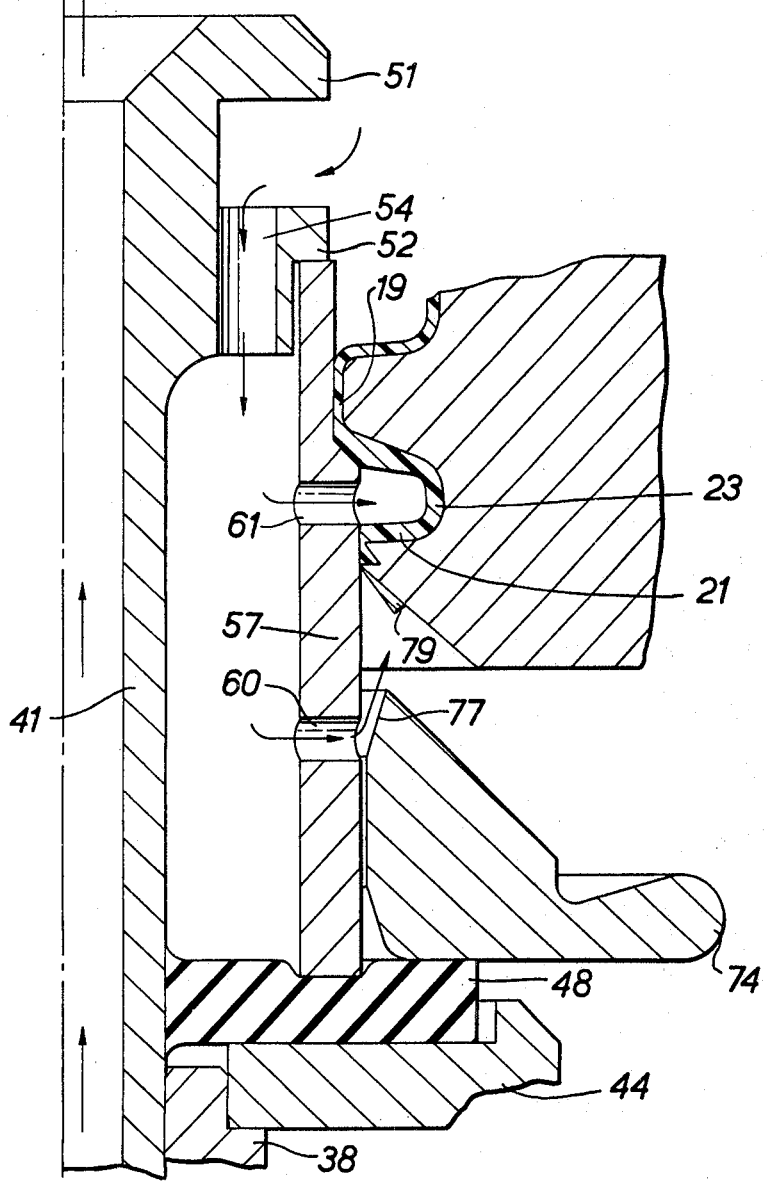
FIGURE 3 is a diagrammatic enlarged section through one side of the lower portion of FIGURE 2 showing parts in more detail.
Figure 4:
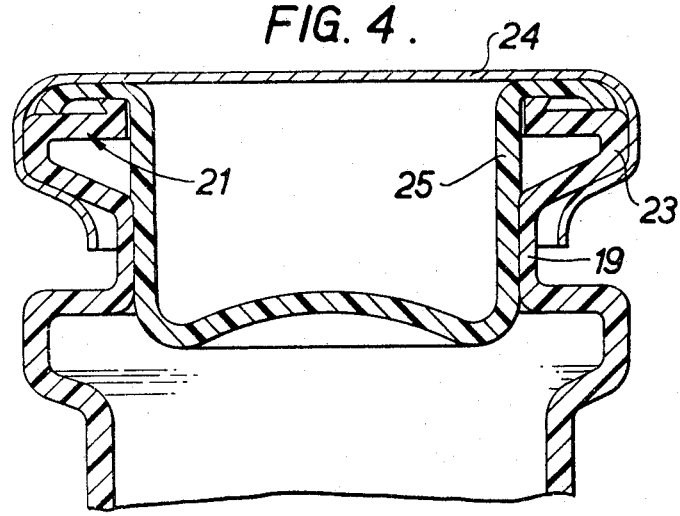
FIGURE 4 shows in section a stoppered covered bottle top.

The lower part 18 of the inverted bottle tapers in frustoconical fashion towards a cylindrical neck 19 which is of substantially smaller diameter than the internal diameter of the parison before it is blow-moulded as is shown by the broken away lower outlined portion 20 of the parison. Turning now to FIGURE 3 it will be seen that the rim portion 21 of the inverted bottle is provided with a recess defining peripheral bead 23 which enables a foil cap 24 to be crimped over it when the bottle is eventually filled with liquid and plugged with a hollow stopper 25 as is shown in FIGURE 4.

Figure 6:
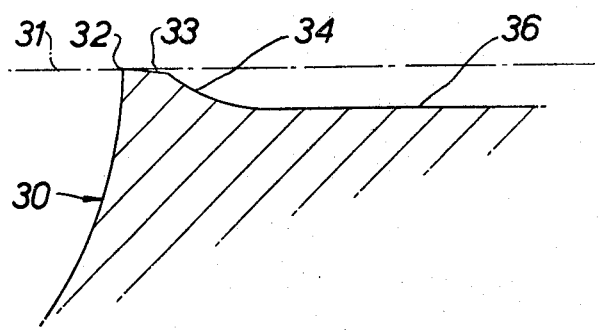
FIGURE 6 is a detail of the region of FIGURE 5 denoted by arrow VI.

Referring now to FIGURES 5 and 6 each of the mould parts 7, 8 is formed with a semi-circular compression surface 30 extending around the split line 31 in the mould 6 in the region of the neck 19 of the bottle and also the frusto-conical portion 18 joining the neck 19 to the body 16 of the bottle. Each of the compression surfaces 30 includes a sharp edge 32 lying in the surface of the mould cavity and a short ramp surface 33 which extends radially away from the sharp edge 32 at an angle of substantially 5° to the diametric plane of the split line 31. The length of the ramp surface is 0.060/0.065 inch and it is joined by a sloping step 34 to a flat land 36 approximately 1⅝ inch long which extends nearly parallel to the split plane of the mould and is spaced .060 inch therefrom.

Turning to FIGURE 7, the conveyor 1, which is of link type, engages a sprocket 37 mounted beneath the mandrel 2 on the lower end of a tubular nozzle ferrule 38 and coaxial therewith. The nozzle ferrule 38 extends vertically upwards to a slider 39 of elongated shape which travels around a track provided above the conveyor. The upper portion of a stepped bore 40 of the nozzle ferrule 38 has mounted in it the lower end portion of a hollow upright shank 41 of a spindle which is held in position by a locking pin 42 extending eccentrically through the nozzle ferrule 39 and engaging in a waist 43 formed around the outside of the shank 41 adjacent its lower end. The portion of the nozzle ferrule 38 projecting above the slider is surrounded by a cylindrical locating piece 44 having an inward radial web 45 which locates in a step 46 formed in the upper edge of the nozzle ferrule 38. A short axial flange 47 extends upwards around the locating piece 44 and helps retain on the upper surface of the radial web 45 a flat silicone rubber washer 48 of approximately 1¼ inch diameter. The rubber washer is threaded onto the shank 41 of the spindle immediately above the nozzle ferrule 38. Above the shank 41 the spindle terminates in an enlarged head 49 having an upwardly directed mouth 50 which communicates through the hollow of the spindle with the bore 40 of the nozzle ferrule 38. The head of the spindle is provided with two axially-spaced radial flanges 51, 52 the upper one 51 of which is provided with four equally spaced vertical holes 53 and the lower of which is provided with eight equally spaced vertical holes 54 four of which register with the holes 53 in the upper flange. The mandrel proper comprises an upright cage formed by two crossed hairpin wires 55 having their return bends 17 at their upper ends brazed to one another and set in mutually perpendicular planes so that the four lower end-portions of the wires pass through the four registering holes 53, 54 in the two flanges of the spindle head 49. Between the two flanges the wires are crimped slightly towards the spindle axis so that although they can be withdrawn from the spindle head fairly easily they cannot drop down beneath the lower flange. The undersurface of the lower flange has its rim stepped at 56 outwardly of the eight holes, the step providing a shoulder engaged by the upper edge of a cylindrical sleeve 57 which encircles the shank 41 of the spindle and rests at its lower end on the silicone rubber washer 48. The sleeve 57 provides a neck insert and it is formed on one side with two axially spaced small holes or openings 60, 61. The lower opening 60 comprises an air vent and the upper opening 61 comprises a bead blowing port. Directly above the bead blowing port 61 the external diameter of the sleeve is reduced at 62 so that its outer surface approximates to the peripheries of the two radial flanges 52, 53 on the spindle head 49. The lower portion of the sleeve is encircled by a flanged stripping ring 74. The ring 74 rests on the silicone rubber washer 48 and is provided with a radial flange 65 which projects beyond the locating piece 44 and has its upper surface sloping downwardly and inwardly towards an annular hub on the ring 74. The hub of the ring 74 has a frusto-conical upper surface 75 projecting upwardly from immediately above the inside of the flange 65 and terminating close to the outside of the sleeve 57. The stripping ring 74 is a slack fit over the sleeve 57 and the upper and lower portions of its annulus are bevelled slightly, the upper bevel 77 terminating adjacent the bottom of the air vent 60 formed through the sleeves shown clearly in FIGURE 3.

Arranged above the centre line of each of the moulds is a caliper centering device shown in end view at 69 in FIGURE 2. The centering device centres the upper end of each of the parisons in the mould 6 during final closing movement of the two parts 7, 8 of the mould.

When the apparatus is in use the hot PVC. parisons at 165° C. leave the oven 4 in batches of six and are individually located between the two parts 7, 8 of each of the six moulds 6 which at this time are in the open position as shown in FIGURE 1. Each parison rests at its lower end on the top surface of the flange 65 of the stripping ring 74 and the frusto-conical upper surface 75 of the hub of the flange serves to centre the lower end of the parison with respect to the mould axis. When the parison is centered within the mould the lower end of the nozzle ferrule 38 is aligned with a jet (not shown) for injecting high pressure air upwardly through the bore 40 of the nozzle ferrule 38 and hollow spindle to the interior of the mould.

After the six parisons have been centered in the six open moulds 6 as shown in FIGURE 1 the two parts 7, 8 of the moulds are pressed towards one another by their hydraulic rams 12 and close the moulds 6. During closing movement of the moulds the centering devices 69 operate to center the upper end of each parison before the upper ends of the two parts 7, 8 of each mould 6 close on the upper end portion of the parison and nip it between them. When the top end-portion of the parison is so nipped a pinch 78 is formed which effectively seals the upper end of the parison while being blow-moulded.

During the closing movement of the two parts 7, 8 of each mould the neck-forming surfaces 30 of the mould parts engage the lower end-portion of the parison first. As a result the lower end-portion of the parison is compressed initially into a generally elliptical cross-section, the major axis of the ellipse lying in the plane of the mould splitting line 31. As the total periphery of the neck-forming surfaces 30 of the mould parts 7, 8 is shorter than the periphery of the parison the surplus parison material is bulged out between the two parts of the mould as they approach one another. The contraction of the minor axis of the ellipse is permitted by the frusto-conical surface 75 of the hub of the stripping ring 74 and results in the lower rim 21 of the parison being eased off the stripping ring flange from the position shown in dotted outline at 20 in FIGURE 2 and forced by the neck-forming surfaces on the mould parts 7, 8 upwardly against the upper portion of the mandrel sleeve 57 above the hub and providing the neck insert. During final closing movement of the mould the bulged-out portions of surplus material at each side of the lower end-portion of the parison are compressed between the parallel lands 36 on the mould parts 7, 8 into flattened folds 80 as shown in FIGURE 5. Simultaneously the sharp edges 32 formed on the compression surfaces come together and nip the roots of the flattened folds where they join the portion of the parison which is now compressed between the neck insert 57 and the neck-forming surfaces 30 on the mould parts.

When the mould has closed, high pressure air is injected through the nozzle ferrule 38 into the interior of the parison to expand it into conformity with the contour of the mould cavity as shown in FIGURE 2. During expansion of the parison some of the air leaks downwardly around the outside of the upper flange 51 of the spindle head 49 as shown in FIGURE 3, and through the four openings 54 provided in the lower flange 52 between the wires 55. Part of this air flows outwardly through the bead blowing port 61 as shown by arrows and thus forces an annular portion of the parison around the sleeve 61 into an annular channel formed in the mould parts to provide a bead 23 around the neck of the bottle. A portion of the air trapped inside the sleeve also flows through the air vent 60 to atmosphere and is directed by the upper bevel 77 on the flange stripping ring 74 towards the scrap portions 79 of the surplus parison material projecting from the underside of the closed mould. This escaping air serves the dual purpose of cooling the scrap and also the neck insert sleeve 57. During formation of the neck bead 23 the formation of small crescent-shaped indents adjacent the split line between the two moulded parts is avoided by means of breather holes 90 shown in FIGURE 5 and which extend radially through the two mould parts at an angle of approximately 5 degrees to the split line 31 of the mould. These breather holes prevent the formation of pockets of air between the annular recess and the expanding portion of the neck of the bottle during formation of the bead 23.

The time taken to blow the parison is normally between 4 and 6 seconds after which period the compressed air is turned off and the two parts 7, 8 of each of the six moulds 6 are separated by means of the hydraulically operated rams 12. The centering devices 69 are then raised and the conveyor 1 is operated to carry the six inverted bottles produced in the moulds to the stripping station 10 where the blow-moulded articles 13 are removed from the mandrels 2 and surplus material is removed from the top and bottom end-portions of the articles.

The conveyor 1 operates in steps and, at each step, six loaded mandrels 2 carry tube sections into the oven 4; a batch of six parisons is conveyed from the other end of the oven 4 to the moulding station 5; and, six moulded articles 13 are conveyed from the moulding station 5 to the stripping station 10.

By using the technique for forming the neck portions of the articles described above, bottles having a body diameter to neck diameter in excess of the ratio of 2.8:1 can be obtained as the neck diameter is no longer dependent on the diameter of the parison. It is found in practice that unless the ramp surface 33 and lands 36 shown in FIGURE 6 are provided between the closing mould parts 7, 8 the interior surface of the neck of the finished article 13 will not conform exactly to the cylindrical shape of the neck insert but will show notches lying in the split plane of the mould 6. Such notches result in weaknesses in the neck of the bottle and in leak paths which prevent a stopper 25 from being applied satisfactorily to the bottle.

The invention is usable with other materials than polyvinyl chloride. For instance polyethylene may be used.

It will also be understood that although the mould cavity is defined between two mould parts 7 and 8, more than two mould parts may, in some circumstances, be preferred.

I claim:
1. A method of manufacturing a blow-moulded hollow article having a neck portion encircled by a hollow bead at one end of a body portion closed at the opposite end, comprising stationing a pressure-deformable tube with a neck insert including a body-blowing orifice and bead-blowing port in one end of the tube in an open mould which is split lengthwise of the tube into mould parts, the mould parts having portions arranged to close the opposite end of the tube upon closure of the mould, cavity portions defining the body portion of the article upon closure of the mould, and exterior neck-forming surfaces including cavity portions defining the hollow bead between surface portions which press the tube against the insert on opposite sides of the bead-blowing port upon closure, closing the mould about the tube and the insert to close the opposite end of the tube and press the tube against the insert on opposite sides of the bead-blowing port in the insert, blowing fluid under pressure through the body-blowing orifice to expand the pressure-deformable tube and form the body portion and blowing the same fluid under pressure from the body forming portion of the pressure-deformable tube through passage means in the neck insert to the bead-blowing port to force a portion of the tube wall against the bead cavity portions and thereby forming a hollow bead encircling the neck portion.

2. The method as claimed in claim 1 in which the mould parts include breather passages extending from the bead cavity portions, and bleeding air from the bead cavity portions while blowing fluid through the bead-forming port.

3. A method of manufacturing a blow-moulded hollow article having a neck portion at one end of a body portion closed at the opposite end, comprising supporting the bottom end of a pressure-deformable tube on a ring with a neck insert smaller in diameter than the tube including a body-blowing orifice and a scrap-cooling orifice in the bottom end portion of the tube in an open mould which is split lengthwise of the tube into mould parts, the mould parts having portions arranged to close the upper end portion of the tube upon closure of the mould, cavity portions defining the body portion of the article upon closure of the mould, and exterior neck-forming surfaces which press the tube inwardly against the insert above the supporting ring upon closure, a frusto-conical surface portion extending upwardly and inwardly from the ring inside the tube below the exterior neck-forming surfaces of the mould, closing the mould about the tube and the insert to close the opposite end of the tube and press the tube inwardly against the insert and draw the bottom end portion inwardly against the frusto-conical surface to form an outwardly flared scrap portion below the mould, blowing fluid under pressure through the body-blowing to form the body portion and blowing the fluid from the body portion of the tube through passage means in the neck insert and the scrap-cooling orifice against the scrap portion to cool the scrap portion.

References Cited
UNITED STATES PATENTS

| 2,787,023 | 4/1957 | Hagen | 264—98 |
|---|---|---|---|
| 2,943,348 | 7/1960 | Mumford | 18—5 |
| 3,145,243 | 8/1964 | Hagen | 264—98 |
| 3,028,624 | 4/1962 | Parfrey. | |
| 3,120,679 | 2/1964 | Price. | |

FOREIGN PATENTS 551,499    1943    Great Britain.

ROBERT F. WHITE, Primary Examiner

A. M. SOKAL, Assistant Examiner

U.S. Cl. X.R.

18—5; 264—94, 161